United States Patent Office

2,863,729
Patented Dec. 9, 1958

2,863,729

COMBINATION OF HYDROGEN AND OXYGEN

Harold F. McDuffie, Oak Ridge, and Charles H. Secoy, Kingston, Tenn., assignors to the United States of America as represented by the United States Atomic Energy Commission No Drawing. Application February 27, 1953
Serial No. 339,486

12 Claims. (Cl. 23—204)

Our invention relates to an improved method of combining oxygen and hydrogen into water and more particularly to the combination of these elements into water in an aqueous solution thereof.

There are numerous instances in industry wherein hazardous quantities of hydrogen gas, formed as reaction by-product or remaining as an excess must be disposed of when it may be uneconomical to package the hydrogen for utilization or sale. Such a problem may exist for example in the electrolytic production of sodium or in the venting of excess hydrogen from numerous hydrogenation reactions. Furthermore, considerable interest has been evidenced in the design and construction of water cooled and water moderated nuclear reactors, including homogeneous reactors wherein the reactor fuel is in the form of an aqueous solution such as a uranyl sulfate solution or an aqueous slurry such as a uranium dioxide-water slurry. During the operation of these reactors, the water is usually subjected to strong irradiation by gamma and beta rays, fission fragments and neutrons, with the resulting decomposition of water into oxygen, hydrogen and hydrogen peroxide. Although the water decomposes to a relatively minor extent only, even the small degree of decomposition thus far noted is of some concern to nuclear reactor designers, for, the resulting amount of gas bubbling may create a serious pile control problem. In addition, an explosive mixture of hydrogen and oxygen may accumulate, local hot spots may be produced leading to fusion of fuel elements, and corrosion of reactor materials may become accelerated.

Numerous attempts, therefore, have been made to rapidly and efficiently dispose of hydrogen by combining same with oxygen to form water. Both flame and catalytic recombination systems have been employed to combine these gases, it usually being necessary to first collect the gas bubbles. Catalysts usually consisted of platinum, platinum-on-alumina, platinum-on-charcoal or silver. However, such systems were very intricate and expensive and the conditions for safe and efficient operation were relatively critical. Furthermore, such solid catalysts were subject to surface poisoning.

Reference is also made to co-pending patent application Serial No. 233,118, filed June 22, 1951, by A. O. Allen and C. J. Hochanadel, entitled "Suppression of Water Decomposition," in which hydrogen and oxygen in aqueous solution are recombined to an unexpected degree by dissolving an additional small amount of hydrogen gas in the solution. However, in addition to the inconvenience inherent in maintaining a gas concentration in an aqueous solution, this method is applicable only to relatively pure water rather than to aqueous solutions of various compounds, and is, therefore, rather limited in utility.

An object of our invention, therefore, is to provide an improved method for disposing of hydrogen.

Another object of our invention is to provide an improved method of combining hydrogen with oxygen.

Another object of our invention is to provide an improved method for recombining hydrogen and oxygen formed in aqueous solutions by ionizing radiations.

Another object of our invention is to provide an improved method for continuously recombining hydrogen and oxygen which are being formed in aqueous solutions by nuclear reactor radiations.

Still another object of our invention is to provide a method for increasing the operating safety of a nuclear reactor which uses water as coolant, moderator, solvent, or component of a slurry.

Another object of our invention is to provide an improved method for continuously recombining hydrogen and oxygen which is being formed in an aqueous uranyl sulfate solution by nuclear reactor radiations.

Other objects and advantages of our invention will be apparent from the following description.

In accordance with our invention, we find that hydrogen and oxygen may be rapidly combined under greatly varying conditions by providing a small amount of copper ions in an aqueous solution of said hydrogen and oxygen under superatmospheric pressure.

When employing our invention, the combining of hydrogen and oxygen is accomplished homogeneously before bubbles are formed and, of particular importance in a nuclear reactor, the heat of reaction is uniformly dissipated. There is, therefore, no localized heating as in the case of the prior art solid catalysts herein described. In addition, nuclear reactor power fluctuations due to erratic bubble dispersion and removal are eliminated.

Our method is generally applicable to the combining of hydrogen and oxygen in aqueous solutions under superatmospheric pressures and preferably at temperatures of approximately 150° C. to approximately 450° C. and pressures corresponding to these temperatures while best results appear to be obtainable at temperatures above about 250° C. Although combination still takes place at temperatures even lower than 150° C., it may be too slow for practical operation.

Copper ions may be provided in aqueous solutions by dissolving therein copper values which are soluble in the specific solution being employed. Thus, for example, relatively soluble copper salts such as $CuSO_4$, $CuF_2$ and $Cu(NO_3)_2$ may be satisfactorily employed. In an aqueous acidic solution having dissolved therein a reactor fuel material, the copper ions could be provided by dissolving copper metal in the solution. However, the addition of a soluble copper salt is generally preferred. To avoid introducing additional impurities into aqueous homogeneous reactor fuel solutions, it is also preferred to introduce the copper ion by means of a copper salt whose anion is identical to the anion of the fuel compound already present. For example, if uranyl sulfate is employed in an aqueous fuel solution it may be preferable to add the copper in the form of copper sulfate.

The amount of copper to be added in accordance with our invention is not critical. For a constant temperature and constant neutron flux, the degree of recombination, and, therefore, the equilibrium gas pressure (constant recombination rate) are dependent upon the copper concentration. Thus, the greater the copper concentration, the lower the equilibrium pressure. However, the amount of combination for any given copper content is controlled by numerous variables such as pressure and temperature. Thus, routine testing and experimentation may be advantageous in determining the preferred amount of copper to be added. However, we generally find that only a slight concentration of copper ion in aqueous solution effects almost complete combination of hydrogen and oxygen dissolved therein. Suitable quantities of copper ion dissolved in aqueous solution, for example, are from approximately 0.001 molar to approximately 0.2 molar, while a concentration of approximately 0.05 molar is generally preferred. Although other ions, primarily ions of the elements thallium, iron, chromium, tin, silver, iodine, titanium, molybdenum, tungsten, technetium, and manganese under similar conditions may demonstrate some degree of success in effecting the combination, copper appears uniquely superior to all of the many tested.

Our invention will be further illustrated by the following specific examples.

Example I illustrates a combination test performed in the absence of copper ions.

EXAMPLE I

Hydrogen and oxygen were introduced into a stainless steel bomb above distilled water at pressures of 300 pounds per square inch and 600 pounds per square inch respectively, the temperature being maintained at 249° C. The change of pressure with time was tabulated in Table I as follows. The "corrected" pressure is equal to the total pressure minus steam pressure at the particular temperature.

*Table I*

| Time (hours): | Corrected pressure (lbs./sq. in.) |
|---|---|
| .00 | 1334 |
| .50 | 1314 |
| 1.00 | 1304 |
| 1.50 | 1284 |
| 2.00 | 1274 |
| 2.50 | 1244 |
| 3.00 | 1234 |
| 3.50 | 1224 |
| 4.00 | 1209 |

EXAMPLE II

The method of Example I was employed except that the water was made 0.04 molar in $CuSO_4$ and the temperature was maintained at 239° C. The change of pressure with time was tabulated in Table II as follows:

*Table II*

| Time (hours): | Corrected pressure (lbs./sq. in.) |
|---|---|
| 0 | 647 |
| 0.50 | 292 |
| 1.00 | 142 |
| 1.50 | 112 |
| 2.00 | 97 |

By conducting this example at a temperature lower than that employed in Example I, other conditions being equal, the effectiveness of our invention was demonstrated even more strikingly than if performed at the higher temperature, since lowering the temperature in the absence of catalyst would further inhibit the combination of $H_2$ and $O_2$. The effect of the Cu ions is still sufficient to overcome entirely this additional disadvantage as is obvious from a comparison of the data.

Example III illustrates a test in the absence of copper ion but in the presence of uranyl sulfate.

EXAMPLE III

The method of Example II was employed except that the distilled water was replaced by an aqueous uranyl sulfate solution containing 29.7 grams of uranium per liter, and the temperature was maintained at 290° C. The change of pressure with time was tabulated in Table III as follows:

*Table III*

| Time (hours): | Corrected pressure (lbs./sq. in.) |
|---|---|
| 0 | 1335 |
| 1 | 1205 |
| 2 | 1110 |
| 3 | 1030 |
| 4 | 945 |
| 5 | 870 |
| 6 | 820 |

The results here appear to indicate that the uranyl sulfate itself, if pure, had some effect in catalyzing the recombination of hydrogen and oxygen. However, the degree of the effect was insufficient to solve the decomposition problem in an adequate manner.

Example IV illustrates the effect of adding copper ion to an aqueous uranyl sulfate solution.

EXAMPLE IV

The method of Example III was employed except that the aqueous uranyl sulfate solution was made 0.16 molar in copper sulfate. The change of pressure with time was tabulated in Table IV as follows:

*Table IV*

| Time (hours): | Corrected pressure (lbs./sq. in.) |
|---|---|
| 0 | 1120 |
| 1/6 | 680 |
| 1/3 | 400 |
| 1/2 | 255 |
| 2/3 | 180 |
| 5/6 | 140 |
| 1 | 120 |

These results indicate that copper is outstandingly effective in that its use results in a recombination rate in the neighborhood of 100,000 times that shown by uranyl sulfate alone at the same temperature, as may be calculated from equilibrium constant data.

EXAMPLE V

Three aqueous solutions in stainless steel bombs were placed in a nuclear reactor in a zone wherein the neutron flux was of the order of $6 \times 10^{11}$ neutrons per square centimeter per second. The first solution contained 40 grams per liter uranyl sulfate, the second solution contained 40 grams per liter uranyl sulfate and was 0.00625 molar in copper sulfate and the third solution contained 40 grams per liter uranyl sulfate and was 0.009 molar in copper sulfate. The uranium was enriched to 93.2% in the 235 isotope. The samples were permitted to remain at various temperatures for a sufficient period of time for equilibrium pressures to be obtained. These pressures for each solution, in pounds per square inch, are tabulated as follows:

*Table V*

| | 195° | 210° | 230° | 240° | 250° | 260° |
|---|---|---|---|---|---|---|
| 40 g./l. $UO_2SO_4$ | | | | | ¹ 5,000 | |
| 40 g./l. $UO_2SO_4$ 0.00625 M $CuSO_4$ | | 2,000 | 700 | | | |
| 40 g./l. $UO_2SO_4$ 0.009 M $CuSO_4$ | 2,000 | 850 | 300 | 190 | 100 | 60 |

¹ Corrected equilibrium pressures in p. s. i.

EXAMPLE VI

The method of Example V was employed except that an aqueous solution 0.16 molar in uranyl sulfate and 0.05 molar in copper sulfate was employed, and the neutron flux was of the order of $1 \times 10^{13}$ neutrons per square centimeter per second. The change of equilibrium pressure with temperature is tabulated as follows:

Table VI

| Temperature (° C.): | Corrected pressure (lbs./sq. in.) |
|---|---|
| 190 | 7668 |
| 200 | 5855 |
| 210 | 3598 |
| 220 | 2140 |
| 230 | 1205 |
| 240 | 595 |
| 250 | 304 |

It is noted from all the above examples that the presence of small amounts of copper ions in the solutions described has a profoundly significant effect in displacing the $H_2O \rightleftharpoons \frac{1}{2}O_2 + H_2$ equilibrium strongly in the direction of water formation with a resulting low equilibrium gas pressure.

It is to be understood of course that the above examples are merely illustrative, and do not limit the scope of our invention, which should be understood to be limited only as indicated by the appended claims.

We claim:

1. A method of combining hydrogen with oxygen which comprises providing copper ions in an aqueous solution of said hydrogen and oxygen under superatmospheric pressure and at a temperature above approximately 150° C.

2. A method of forming water from hydrogen and oxygen in aqueous solution which comprises providing a small amount of copper ions in said solution at a temperature of approximately 150° C. to approximately 450° C.

3. The method of claim 2 in which the temperature is above approximately 250° C.

4. A method of forming water from hydrogen and oxygen in aqueous solution which comprises providing said solution with copper ions in a concentration of approximately 0.001 molar to approximately 0.2 molar at a temperature of approximately 150° C. to approximately 450° C.

5. A method for continuously recombining hydrogen and oxygen resulting from the subjection of an aqueous solution to ionizing radiations, which comprises providing a small amount of copper ion in said solution at a temperature above approximately 150° C.

6. A method for continuously recombining hydrogen and oxygen resulting from the subjection of an aqueous solution to ionizing radiations which comprises providing said solutions with copper ions in a concentration of approximately 0.001 molar to approximately 0.2 molar at a temperature of approximately 150° C. to approximately 450° C.

7. The method of claim 6 in which the ionizing radiations are nuclear reactor radiations.

8. The method of claim 6 in which the ionizing radiations are fast neutrons.

9. The method of claim 6 in which the ionizing radiations are gamma rays.

10. The method of claim 6 in which the ionizing radiations are fission fragments.

11. A method for continuously recombining hydrogen and oxygen resulting from the subjection of an aqueous uranyl sulfate solution to nuclear reactor radiations which comprises providing a small amount of copper sulfate in said solution at a temperature above approximately 150° C.

12. A method of continuously recombining hydrogen and oxygen resulting from the subjection of an aqueous uranyl sulfate solution to nuclear reactor radiations which comprises providing said solution with copper ions in a concentration of approximately 0.05 molar at a temperature above approximately 250° C.

References Cited in the file of this patent

AEC Document MDDC–1056, June 1947, declassified June 23, 1947, pages 1–11.

Allen et al.: "J. of Phy. Chem.," vol. 56, pages 575–586, May 1952; received Feb. 25, 1952, and this date relied on to show prior knowledge under Sec. 155 of the Atomic Energy Act of 1954.